US011470380B1

(12) United States Patent
Li et al.

(10) Patent No.: US 11,470,380 B1
(45) Date of Patent: Oct. 11, 2022

(54) SYSTEMS AND METHODS FOR ADAPTIVELY MANAGING LIVE VIDEO STREAMING

(71) Applicant: Meta Platforms, Inc., Menlo Park, CA (US)

(72) Inventors: Meng Li, Redmond, WA (US); Chenyong Xu, Fremont, CA (US); Clement Genzmer, Redwood City, CA (US); Yassir Solomah, Seattle, WA (US); Jianyong Xiao, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/214,650

(22) Filed: Mar. 26, 2021

(51) Int. Cl.
*H04N 21/433* (2011.01)
*H04N 21/442* (2011.01)
*H04N 21/2187* (2011.01)

(52) U.S. Cl.
CPC ... *H04N 21/4333* (2013.01); *H04N 21/44209* (2013.01); *H04N 21/2187* (2013.01)

(58) Field of Classification Search
CPC ......... H04N 21/4333; H04N 21/44209; H04N 21/2187
See application file for complete search history.

(56) References Cited

U.S. PATENT DOCUMENTS

| 2012/0086814 A1* | 4/2012 | Tsubaki | H04N 21/4305 348/192 |
| 2014/0173055 A1* | 6/2014 | Yu | H04L 65/80 709/219 |
| 2015/0189365 A1* | 7/2015 | Xing | H04N 21/8455 725/88 |

FOREIGN PATENT DOCUMENTS

| EP | 3767915 A1 | 1/2021 |
| WO | 2018125590 A1 | 7/2018 |
| WO | 2021026509 A1 | 2/2021 |

OTHER PUBLICATIONS

International Search Report and Written Opinion for International Application No. PCT/US2022/021061, dated Aug. 10, 2022, 11 pages.

* cited by examiner

*Primary Examiner* — Oschta I Montoya
(74) *Attorney, Agent, or Firm* — Sheppard Mullin Richter & Hampton LLP

(57) ABSTRACT

Systems, methods, and non-transitory computer-readable media can stream a live video stream from a content provider. A portion of the live video stream can be buffered in a content buffer. The portion of the live video stream accumulated in the content buffer can be monitored during playback of the live stream. A latency action can be determined based on the monitoring of the portion of the live video stream. The latency action can adaptively adjust the playback of the live video stream. The playback of the live video stream can be caused to be adjusted adaptively according to the latency action.

20 Claims, 8 Drawing Sheets

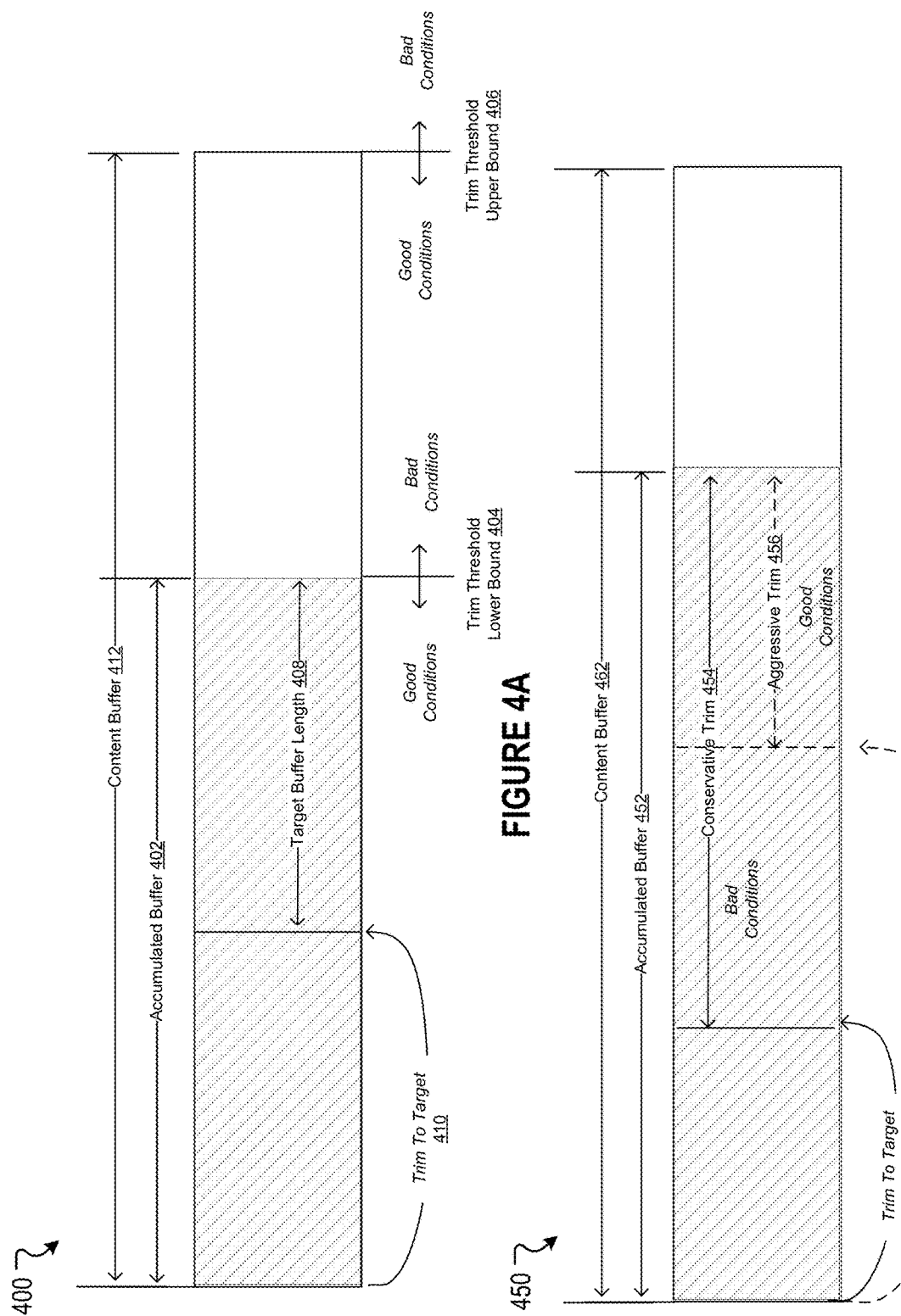

SYSTEMS AND METHODS FOR ADAPTIVELY MANAGING LIVE VIDEO STREAMING

FIELD OF THE INVENTION

The present technology relates to the field of live video streaming. More particularly, the present technology relates to approaches for improving content streaming over computer networks.

BACKGROUND

Today, with the availability of increased network bandwidth, more people are producing and consuming live video streams through online content distribution platforms. These platforms typically include a server that distributes content to computing devices over computer networks. In some instances, network latency issues can arise when distributing content over computer networks. That is, there can be a lag (or delay) from when a server sends content to when a computing device receives the content. This lag can significantly degrade user experience, especially when the delayed content is intended to be presented in real-time, as is the case with live video streams, live shopping, or live gaming, as just some examples.

SUMMARY

Various embodiments of the present disclosure can include systems, methods, and non-transitory computer readable media configured to stream a live video stream from a content provider. A portion of the live video stream can be buffered in a content buffer. The portion of the live video stream accumulated in the content buffer can be monitored during playback of the live stream. A latency action can be determined based on the monitoring of the portion of the live video stream. The latency action can adaptively adjust the playback of the live video stream. The playback of the live video stream can be caused to be adjusted adaptively according to the latency action.

In an embodiment, an amount of available bandwidth between the computing device and the content provider can be monitored. The determining the latency action based on the monitoring the portion can comprise: adaptively adjusting at least one buffer size threshold based on the amount of available bandwidth or an occurrence of a stall; and determining when to perform the latency action based on the portion of the live video stream accumulated in the content buffer and the at least one buffer size threshold.

In an embodiment, an amount of available bandwidth between the computing device and the content provider can be monitored. The determining the latency action based on the monitoring the portion can comprise: adaptively adjusting a trim amount based on the available bandwidth or an occurrence of a stall; and determining an amount of the portion of the live video stream accumulated in the content buffer to jump a currently playing position or a buffer loading position in the latency action based at least in part on the trim amount.

In an embodiment, the causing the playback of the live video stream to be adaptively adjusted can comprise: jumping a currently playing position associated with the playback from a first position associated with a first time to a second position. Based on the jumping, the playback can excludes the live video stream accumulated in the content buffer between the first position and the second position.

In an embodiment, the causing the playback of the live video stream to be adjusted adaptively can comprise: jumping a buffer loading position associated with the playback from a first position associated with a first time to a second position associated with a second time. Based on the jumping, a portion of the live video stream between the first position and the second position is not accumulated in the content buffer.

In an embodiment, the jumping the buffer loading position associated with the playback can comprise: determining that a manifest discontinuity is detected during receipt of the live video stream.

In an embodiment, the jumping the buffer loading position associated with the playback can comprise: determining that a threshold amount of the live video stream is accumulated in the content buffer; and pausing receipt of the live video stream for a pause duration period.

In an embodiment, the monitoring the portion of the live video stream accumulated in the content buffer during the playback of the live video stream can comprise calculating a standard deviation for fluctuations of the portion of the live video stream accumulated in the content buffer within a defined time window.

In an embodiment, a rate associated with the latency action can be determined. The latency action can be limited from performance so that the rate does not exceed a specified rate of latency actions.

In an embodiment, a signal from the content provider that indicates a stall caused by the content provider can be received. In response to the receiving the signal from the content provider, a latency manager configured to cause the computing device to adaptively adjust the playback can be called so that future stalls can be avoided.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 4A-4B illustrate example techniques of adaptively trimming a content buffer, according to an embodiment of the present technology.

Figure 1:
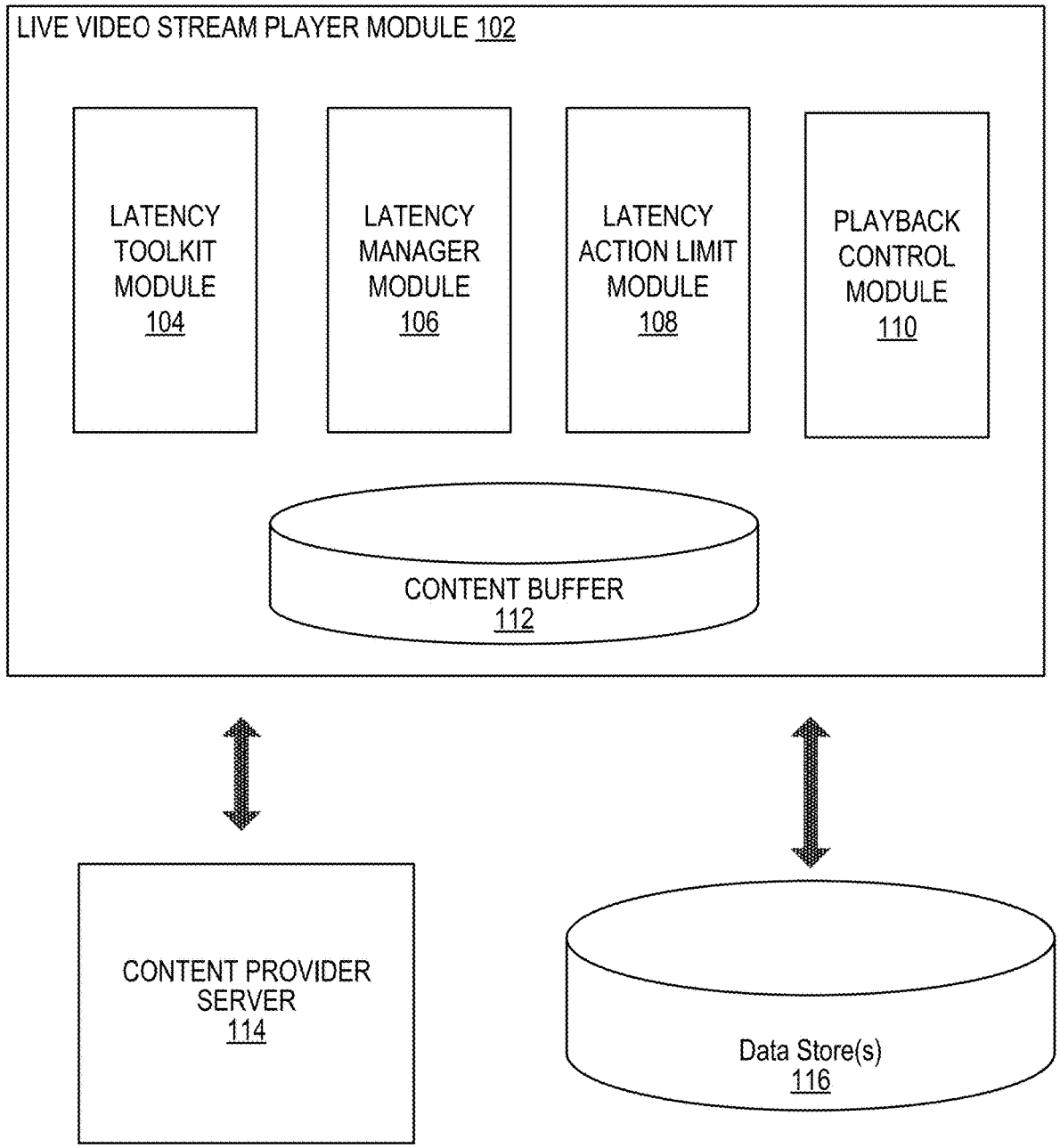
FIG. 1 illustrates an example system including a live video stream player module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Live Video Stream Latency Management

Today, with the availability of increased network bandwidth, more people are producing and consuming live video streams through online content distribution platforms. These platforms typically include a server that distributes content to computing devices over computer networks. In some instances, network latency issues can arise when distributing content over computer networks. That is, there can be a lag (or delay) from when a server sends content to when a computing device receives the content. This lag can significantly degrade user experience, especially when the delayed content is intended to be presented in real-time, as is the case with live video streams, live shopping, or live gaming, as just some examples.

Live video streaming can be challenging for a number of reasons. For example, one challenge relates to provision of live video streams at the best quality despite fluctuations in network bandwidth. Unlike prerecorded (or on-demand) video content, which is less susceptible to network fluctuations, live video streaming requires computing devices to intelligently adapt to fluctuations in bandwidth so that content being streamed can be delivered and presented without interruption. Conventional approaches attempt to address such latency issues by providing a large content buffer to store content associated with a live video stream so that the live video stream can be provided without interruption. However, maintaining a large content buffer can result in undesirable consequences, such as increased end-to-end latency that results in viewers of a live content stream seeing content that is no longer live (or in real-time). For example, if a content buffer accumulates 1 minute of a live video stream to account for fluctuations in available network bandwidth, viewers of the live video stream with the content buffer can be presented with a "dead" live video stream that is at least 1 minute behind. Such delays can dramatically degrade viewer experience, which can be associated with a number of other disadvantages, such as decreased viewer engagement. Accordingly, the conventional approaches pose significant disadvantages in live video streaming.

An improved approach rooted in computer technology overcomes the foregoing and other disadvantages associated with conventional approaches specifically arising in the realm of computer technology. Based on computer technology, the present technology provides an adaptive latency control framework that improves end-to-end latency for live video streaming. The present technology can monitor various playback signals and can instruct a live video stream player to perform various latency actions that reduce latency. The various playback signals can include buffer states, network bandwidth, broadcaster states, or the like. The latency actions can include buffer trims, position (e.g., cursor) jumps, or the like. By adaptively performing latency actions based on playback signals, the present technology can reduce latency in live video streaming and, thus, can allow viewers to see live content with little or no delay or interruption, while maintaining streaming quality. Further, the present technology can intelligently perform latency actions in a manner that reduces or eliminates stalls that can occur when a computing device is waiting to receive a new portion of a live video stream. More details describing the present technology are provided below.

FIG. 1 illustrates an example system 100 including a live video stream player module 102, according to an embodiment of the present technology. The live video stream player module 102 can be configured to receive and reproduce a live video stream that is obtained from or provided by a content provider server 114 over one or more computer networks. The live video stream player module 102 can include a latency toolkit module 104, a latency manager module 106, a latency action limit module 108, a playback control module 110, and a content buffer 112. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details.

In various embodiments, the live video stream player module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the live video stream player module 102 can be, in part or in whole, implemented as software running on one or more computing devices or systems, such as on a server computing system or a client computing device. In some instances, the live video stream player module 102 can be, in part or in whole, implemented within or configured to operate in conjunction with a social networking system (or service), such as the social networking system 730 of FIG. 7. Likewise, in some instances, the live video stream player module 102 can be, in part or in whole, implemented within or configured to operate in conjunction with or be integrated with a client computing device, such as the user device 710 of FIG. 7. For example, the live video stream player module 102 can be implemented as or within a dedicated application (e.g., app), a program, or an applet running on a user computing device or client computing system. The application incorporating or implementing instructions for performing functionality of the live video stream player module 102 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that there can be many variations or other possibilities.

The live video stream player module 102 can be configured to communicate and operate with the at least one data store 116, as shown in the example system 100. The data store 116 can be configured to store and maintain various types of data. In some implementations, the data store 116 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 116 can store information that is utilized by the live video stream player module 102. For example, the data store 116 can store metrics associated with the content buffer 112 (e.g., past buffer usage, standard deviations, coefficient of variation, variances, or the like), stall history, broadcaster states, network bandwidth fluctuations, network connection states, latency action history, or the like. It is contemplated that there can be many variations or other possibilities.

The latency toolkit module 104 can be configured to monitor various metrics relevant to streaming and presenting (or playing) live video streams. The latency toolkit module 104 can provide a buffer meter that measures fluctuations (e.g., buffer fluctuations) in the content buffer 112. Further, the latency toolkit module 104 can receive or acquire various signals and states that can be evaluated to determine latency actions that can be performed to improve delivery and presentation of live video streams. Further still, the latency toolkit module 104 can manage (e.g., maintain and update) various playback positions. The playback positions can include a current playing position, a buffer loading position, and a live head position. The latency toolkit module 104 is described in greater detail herein with reference to FIG. 2.

The latency manager module 106 can be configured to determine a latency action to be performed and related details, such as when to perform the latency action and any particular adjustments to be performed in relation to the latency action. For example, the latency manager module 106 can determine the latency action based on a buffer meter, a bandwidth meter, playback signals, and playback states. The latency manager module 106 is described in greater detail herein with reference to FIG. 2 and FIGS. 4A-4B.

The latency action limit module 108 can be configured to limit performance (or execution) of latency actions based on various conditions. The latency action limit module 108 can prevent excessive latency actions, which can negatively affect viewer experience. For example, in some embodiments, latency actions can be rate-limited for a time window (e.g., once every 1 minute, 10 minutes, 30 minutes, 1 hour, or the like) such that no more than a threshold number of latency actions can be performed during the time window.

The playback control module 110 can be configured to control playback of a live video stream by performing latency actions. In some embodiments, presentation (or playback) of a live video steam can be controlled via adjustments to a current playing position (e.g., a current position cursor) or a buffer loading position (e.g., a loading cursor) in relation to the content buffer 112. The playback control module 110 is described in greater detail herein with reference to FIG. 5.

The content buffer 112 can be used to manage data associated with a live video stream. Thus, the content buffer 112 can be used to store, accumulate, maintain, update, write, and overwrite data associated with live video streams. The content buffer 112 can be a variable length buffer, circular buffer, or various other types of buffers. The content buffer 112 can vary in size. The size of the content buffer 112 determines how much data associated with a live video stream can be stored in the content buffer 112 at a given time. The size of the content buffer 112 can be described in terms of an amount of data that can be stored in the content buffer 112 or in terms of playback time (e.g., a number of seconds) associated with the data stored in the content buffer 112. A quality (e.g., bitrate) of the live video stream can affect how much time (e.g., how many seconds) of the live video stream can be stored in the content buffer 112 at one time.

Figure 2:
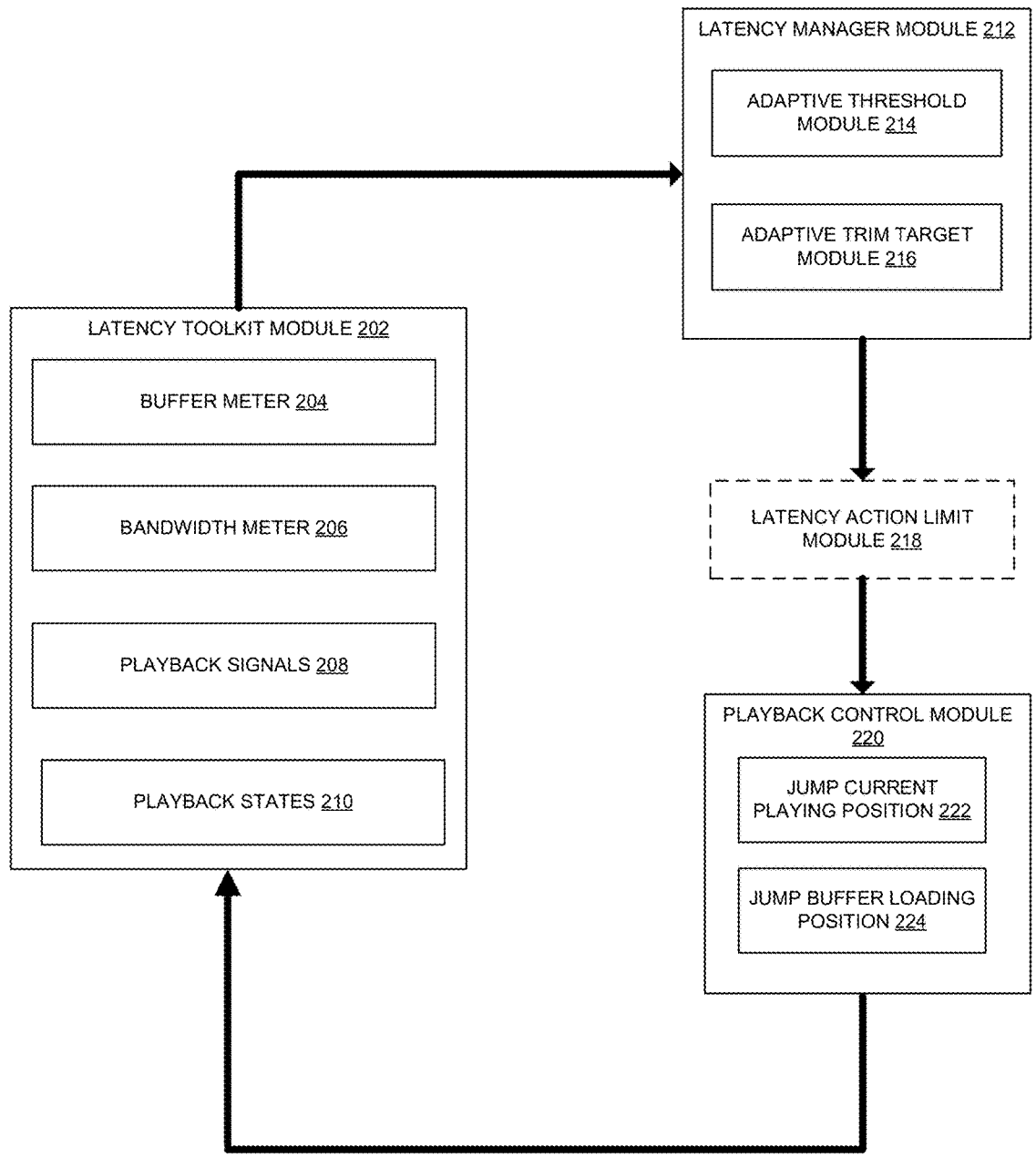
FIG. 2 illustrates example interactions between various example modules of the live video stream player module, according to an embodiment of the present technology.

FIG. 2 illustrates various example modules 200 of the live video stream player module 102, according to an embodiment of the present technology. In some embodiments, the latency toolkit module 104, the latency manager module 106, the latency action limit module 108, and the playback control module 110 of FIG. 1 can be implemented as a latency toolkit module 202, a latency manager module 212, a latency action limit module 218, and a playback control module 220, respectively.

As shown in FIG. 2, the latency toolkit module 202 can monitor a buffer meter 204, a bandwidth meter 206, playback signals 208, and playback states 210. The buffer meter 204 can monitor buffer fluctuations in the content buffer 112 of FIG. 1. The buffer meter 204 can provide various indicators. As an example, the buffer meter 204 can indicate an amount of a live video stream that has accumulated in the content buffer 112 and has not been presented (or played). In another example, the buffer meter 204 can indicate amounts of fluctuation associated with the content buffer 112 (e.g., amplitude of buffer fluctuations). In a further example, the buffer meter 204 can indicate how the content buffer 112 is affected in relation to network bandwidth, historical fluctuations, buffer fluctuation patterns, or the like. In some embodiments, the buffer meter 204 can calculate one or more metrics based on the various indicators, as described below. In some embodiments, the buffer meter 204 can monitor buffer fluctuations for a given time window.

Figure 3A:
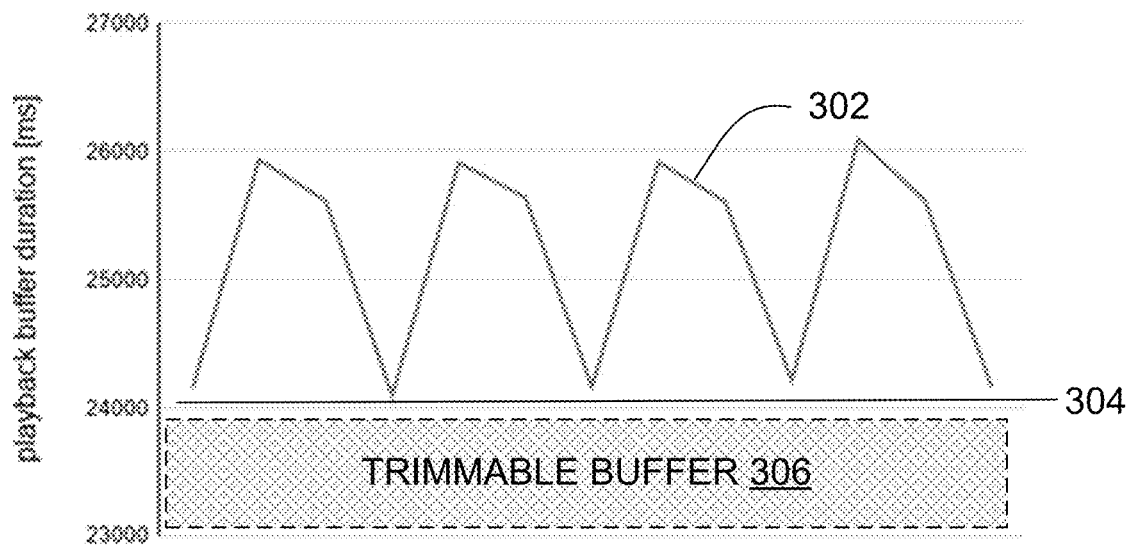
FIGS. 3A-3B illustrate example buffer fluctuations during streaming of a live video stream, according to an embodiment of the present technology.
Figure 3B:
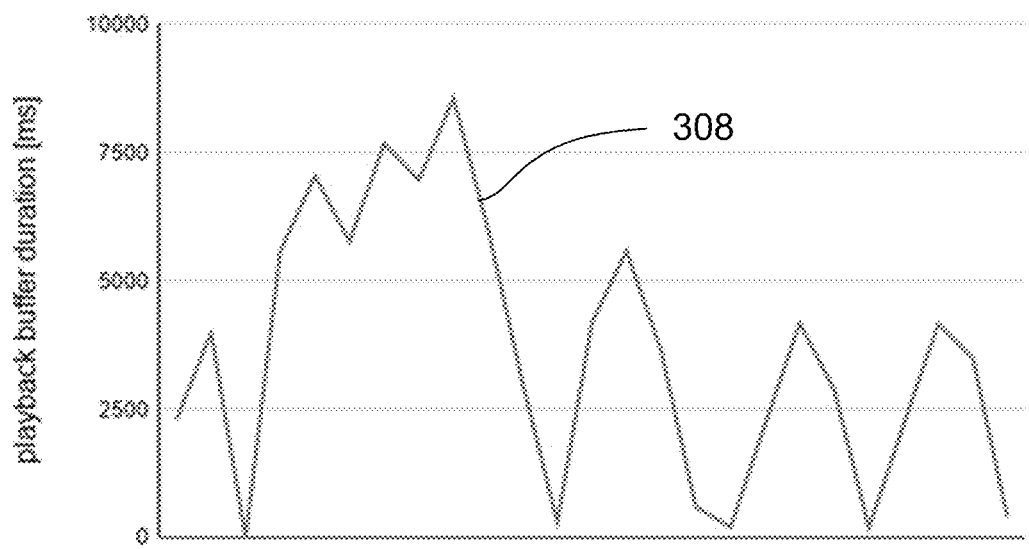

FIGS. 3A-3B illustrate example buffer fluctuations 302, 308 that can occur while streaming a live video stream. The example buffer fluctuations 302, 308 are plotted on a chart having an X-axis that is based on elapsed time and a Y-axis based on a playback buffer duration. The playback buffer duration represents an amount of a live video stream that has accumulated in a content buffer and that has yet to be played (or presented) in terms of time (e.g., milliseconds, seconds, etc.). The example buffer fluctuations 302, 308 can be monitored over a time window (e.g., 1 to 2 minutes). The example buffer fluctuation 302 of FIG. 3A illustrates "good" buffer fluctuation that reflects a desirable and stable network condition. The buffer fluctuation 302 exhibits fluctuation that occurs in a repeated pattern. Additionally, the buffer fluctuation 302 exhibits fluctuation that stays within expected boundary conditions, such as within pre-defined upper and lower threshold buffer levels. The buffer fluctuation 302 represents fluctuation that can be associated with a high predictability of how much live video stream the content buffer 112 can store (or provide) without causing stalls.

The example buffer fluctuation 308 of FIG. 3B illustrates "bad" buffer fluctuation that reflects poor and unstable network conditions. The bad buffer fluctuation 308 exhibits irregular buffer fluctuation. Additionally, the bad buffer fluctuation 308 exhibits fluctuation that reaches the bottom of the Y-axis, which indicates the content buffer 112 no longer stores data associated with a live video stream that can be played and is likely to result in stalls. The bad buffer fluctuation 308 represents fluctuation that can be associated with a low predictability of how much live video stream the content buffer 112 can store (or provide) without causing stalls.

As discussed, the buffer meter 204 can calculate one or more metrics that measure (or describe) buffer fluctuations. For example, standard deviations can be calculated for the example buffer fluctuations 302, 308. The metrics can be used as criteria for a latency action to be performed. For instance, where a standard deviation for the buffer fluctuation 302 is below a predefined standard deviation threshold level and the buffer fluctuation 302 does not fall below a threshold floor 304, a latency action that "trims" a trimmable buffer 306 in which live video stream content is stored can be performed. As described in more detail below in reference to FIG. 5, the "trimming" can involve adjusting a size of the trimmable buffer 306 or adjusting (e.g., jumping) a current playing position or a buffer loading position, for example, through a media player application. By trimming the trimmable buffer 306, more recent portions of the live video stream can be presented to a viewer with a reduced amount of latency than would be possible without trimming the content buffer 112. In some embodiments, the trimmable buffer 306 can be trimmed in a sequence of trims, each trim having a selected trim amount. For example, the trimmable buffer 306 may have a size of 24 seconds. In an initial trim, the trimmable buffer 306 be trimmed to 12 seconds, which limits the trimmable buffer 306 to storing a 12 second duration of live video content. In the next trim, the trimmable buffer 306 can be trimmed to 6 seconds, which limits the trimmable buffer to storing a 6 second duration of live video content. In the next trim, the trimmable buffer 306 can be trimmed to 2 seconds, which limits the trimmable buffer to storing a 2 second duration of live video content, and so forth. The effects of each trim, especially in relation to latency, can be monitored by the latency toolkit module 202 and monitored results can be provided to the latency manager module 212. The latency manager 212 can then adaptively trim the trimmable buffer 306.

The bandwidth meter 206 can provide various indicators relating to network bandwidth. For example, the bandwidth meter 206 can monitor uplink and/or downlink network bandwidth (e.g., megabits/second) that is available to the live video stream player module 102 of FIG. 1. Further, the bandwidth meter 206 can monitor the network bandwidth over a time window. For example, the lowest available network bandwidth or the highest available network bandwidth can be tracked by the bandwidth meter 206 over a 5-minute long time window. In some embodiments, the bandwidth meter 206 can provide various indicators of past network bandwidth conditions and one or more metrics calculated based on the past network bandwidth conditions, including estimated network bandwidth for a time window in the future. Some technologies are capable of providing live video streams with multiple bitrates. For example, adaptive bitrate (ABR) videos can provide a live video stream at multiple qualities to account for variations in available network bandwidth. In some embodiments, different bitrate versions of a live video stream can be provided to a viewer based on an estimated availability of network bandwidth, as monitored by the bandwidth meter 206. For example, while a low-quality version of the live video stream is being streamed, the bandwidth meter 206 can indicate that an amount of network bandwidth that is available (or estimated to be available) exceeds the bandwidth requirement needed to stream the low-quality version. Based on the available network bandwidth, the latency toolkit module 202 may determine to perform a latency action that causes a different high-quality version of the live video stream to be streamed and presented. In some embodiments, when determining whether to trigger a latency action, the estimated network bandwidth can be compared against a required bitrate, variable or constant, of a version of the live video stream. In some embodiments, when determining whether to trigger a latency action, the estimated network bandwidth can be compared against a threshold level of safe bandwidth margin that is above the required bitrate of the version of the live video stream. In some embodiments, when determining whether to trigger a latency action, the estimated network bandwidth can be compared to the highest bitrate version of the live video stream so that (1) a different bitrate version is provided to a viewer when the estimated network bandwidth is lower than the bitrate associated with the highest bitrate version and (2) a latency action is performed when the estimated network bandwidth is greater than the bitrate associated with the highest bitrate version.

The playback signals 208 can be signals that are external or internal to the latency toolkit module 202. Some external signals can include, for example, states associated with a broadcaster of a live video stream (e.g., network conditions of a broadcaster, stalls caused by the broadcaster, or the like), type of data connection (e.g., WiFi, cellular, etc.), data connection status, occurrences of a stall, or the like. Some internal signals can include a history of latency actions performed for a current session of live video streaming, stale manifest counts received for the current session, a number of live chats provided by viewers for the live video stream, a number of manual playback adjustments made by the viewer, or the like. The playback signals 208 can provide additional insight about a viewer device and viewing habits of the viewer (e.g., how often the viewer makes playback adjustments) to allow the latency toolkit module 104 to perform more informed latency actions.

The playback states 210 can include various states relating to a live video stream. For example, the playback states 210 can include a currently playing position that indicates which part of the live video stream is currently being played, a buffer loading position that indicates the most recent portion of the live video stream loaded into the content buffer 112, and a live head position that indicates the most recent portion of the live video stream providable by the server. Some of the playback states 210 are visually illustrated and discussed in more detail below in reference to FIG. 5.

In some embodiments, the latency manager module 212 can be woken up from sleep based on the playback signals 208 and/or playback states 210. For example, in response to an occurrence of a stall, the latency manager module 212 can be woken up. The latency manager module 212 can determine whether a latency action is needed based on any one or combination of metrics, signals, and states received from the latency toolkit module 202.

The latency manager module 212 can be configured to determine and provide one or more latency actions to be performed. More specifically, the latency manager module 212 can determine when and how to perform a latency action based on individual or combined metrics, signals, states as provided by the buffer meter 204, bandwidth meter 206, playback signals 208, and playback states 210. The latency manager module 212 can include an adaptive threshold module 214 and an adaptive trim target module 216. The adaptive threshold module 214 can provide a determination of when to perform a latency action. The adaptive trim target module 216 can provide a determination of how to perform the latency action. When and how to perform the latency action can be adaptively tuned (e.g., tuned in real-time) according to one or more adaptive tuning algorithms that can provide the most suitable thresholds and trim targets. The adaptive threshold module 214 and adaptive trim target module 216 are described in greater detail with reference to FIGS. 4A-4B. Once a determination is made to perform a latency action, the latency manager module 212 can instruct the playback control module 220 to perform (or implement) the latency action.

Optionally, the latency action limit module 218 can be configured to limit a number of latency actions performed. As described in relation to the latency action limit module 108 of FIG. 1, the latency action limit module 218 can prevent excessive latency actions, which can negatively affect viewer experience. Some or all latency actions can be rate limited.

The playback control module 220 can be configured to perform one or more latency actions determined by the latency manager module 212. For example, a latency action can be performed by jumping a current playing position 222 or by jumping a buffer loading position 224, as discussed in more detail in reference to FIG. 5. After performance of a latency action, the latency toolkit module 202 can update the playback states 210 based on the latency action.

FIGS. 4A-4B illustrate example techniques 400, 450 of adaptively trimming a content buffer 412, 462, according to an embodiment of the present technology. The example technique 400 of FIG. 4A describes operations that can be performed by the adaptive threshold module 214 of FIG. 2. The example technique 450 of FIG. 4B describes operations that can be performed by the adaptive trim target module 216 of FIG. 2.

In FIG. 4A, the example technique 400 can determine when to perform a latency action based on one or more trim threshold boundaries (e.g., trim threshold bounds). As illustrated, an accumulated buffer 402 can reflect a portion of a live video stream that has been received and accumulated in the content buffer 412. When the accumulated buffer 402 grows in size (e.g., stores more bytes of live video stream) and reaches a trim threshold bound (e.g., a trim threshold lower bound 404), the example technique 400 can determine that a latency action should be performed.

A trim threshold bound can be adjusted adaptively based on network bandwidth conditions that are monitored by the bandwidth meter 206 of FIG. 2 and/or based on the occurrence of stalls. For example, when the availability of network bandwidth is adequate and stable, the trim threshold lower bound 404 can be reduced (e.g., moved left). Conversely, when the availability of network bandwidth is inadequate and unstable, the trim threshold lower bound 404 can be increased (e.g., moved right). Additionally, the trim threshold lower bound 404 can be reduced when less than a threshold number of stalls have occurred within a time window and, conversely, increased when more than a threshold number of stalls have occurred within the time window. In addition to adjustments of the trim threshold lower bound 404 based on network conditions and stalls, the trim threshold lower bound 404 can be adjusted based on the buffer meter 204, bandwidth meter 206, playback signals 208, playback states 210, or any combination thereof. The adjustments to the trim threshold lower bound 404 can be performed adaptively and in real-time. In various embodiments, as the accumulated buffer 402 reaches the trim threshold lower bound 404, a determination can be made to perform a latency action. The latency action to be performed can provide a target buffer length 408 (e.g., an amount of buffer to maintain after the trim) so that the latency action, when performed, can trim to a target position 410 in the accumulated buffer 402. Thus, for a given target buffer length 408, a decreased trim threshold lower bound 404 can result in a smaller accumulated buffer 402 while an increased trim threshold lower bound 404 can result in a larger accumulated buffer 402.

In some embodiments, a plurality of trim threshold bounds can be provided. For example, FIG. 4A provides a trim threshold upper bound 406 in addition to the trim threshold lower bound 404. The trim threshold upper bound 406 can be adaptively adjusted substantially in the same or similar fashion to the trim threshold lower bound 404. In some instances, the accumulated buffer 402 reaching the trim threshold upper bound 406 can indicate that the accumulated buffer 402 has grown to a threshold size that warrants a latency action. Many variations are possible.

In FIG. 4B, the example technique 450 can determine how much of an accumulated buffer 452 should be trimmed for a latency action. The amount to be trimmed can be adjusted adaptively based on network bandwidth considerations and/or stalls as discussed herein. For example, when network conditions indicate bandwidth is adequate and stable ("Good Conditions"), the example technique 450 can aggressively trim the accumulated buffer 452 to a target position 460 so that a small portion 456 of the accumulated buffer 452 remains. Conversely, when network conditions indicate bandwidth is inadequate or unstable ("Bad Conditions"), the example technique 450 can conservatively trim the accumulated buffer 452 to a target position 458 so that a larger portion 454 of the accumulated buffer 452 remains. Additionally, the accumulated buffer 452 can be aggressively trimmed to the target position 460 when less than a threshold number of stalls have occurred within a time window and, conversely, conservatively trimmed to the target position 458 when more than a threshold number of stalls have occurred within the time window. In addition to adjustments to an amount to trim based on network conditions and stalls, the amount to trim can be adjusted based on the buffer meter 204, bandwidth meter 206, playback signals 208, playback states 210, or any combination thereof. The adjustments to the amount to trim can be performed adaptively and in real-time. In some embodiments, the example techniques 400, 450 may be used in combination. The example technique 400 can determine and provide when to perform a latency action and the example technique 450 can determine and provide how much of the accumulated buffer 402, 452 to trim. Many variations are possible.

Figure 5:
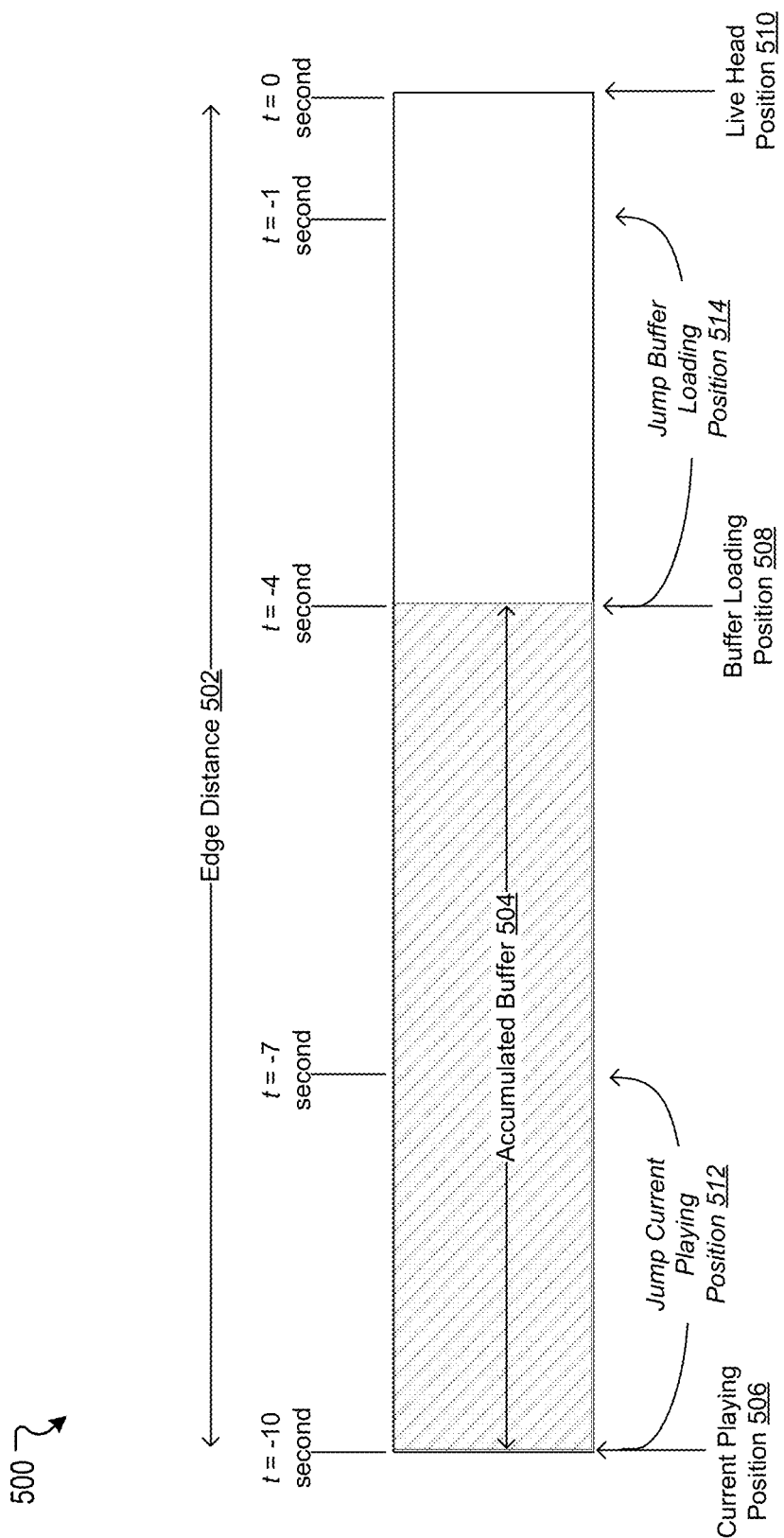
FIG. 5 illustrates example techniques of performing latency actions during streaming of a live video stream, according to an embodiment of the present technology.

FIG. 5 illustrates example techniques 500 of performing latency actions during streaming of a live video stream, according to an embodiment of the present technology. FIG. 5 illustrates an edge distance 502 that defines an amount of live video stream between a current playing position 506 and a live head position 510. The live head position 510 can indicate the most recent portion of the live video stream that can be streamed and presented. As the most recent portion of the live video stream is generated in the present, the live head position 510 can be associated with a timestamp t=0 second. In an ideal world where there is infinite network bandwidth and no latency, the most recent portion of the live video stream identified by the live head position 510 would be presented to a viewer without any stalls. However, in the real world there is at least some delay between content generation and content consumption due to network limitations. Accordingly, the viewer is presented some non-live content that was generated in the past. In this example, the current playing position 506 is t=−10seconds behind the live head position 510. Further, a content buffer (e.g., a content buffer 112 of FIG. 1) can buffer the live video stream up to a buffer loading position 508. In this example, the buffer loading position 508 is t=−4 seconds behind the live head position 510. As a result, the content buffer has accumulated portions of the live video stream between t=−10 seconds and t=−4 seconds which represents an accumulated buffer 504. In some instances, the positions 506, 508, 510 may be referred as "cursors".

A latency action can be performed during a playback of the live video stream by jumping (or advancing) the current playing position 506 to a new position 512 or by jumping the buffer loading position 508 to a new position 514. In various embodiments, jumping the current playing position is an approach in which the current playing position 506 is jumped within the accumulated buffer 504 to the new position 512 that is closer in time (e.g., at t=−7 second) to the buffer loading position 508. Accordingly, the new current playing position 512 corresponds to newer content within the accumulated buffer 504 and, as a result, at least a portion of the accumulated buffer 504 is discarded without being presented to a viewer. Under this approach, a viewer may experience a temporary discontinuity in the live video stream at or near the moment of the jump. The approach can be desirable when a viewer has a fast (or reliable) network connection. In instances where latency is caused by an oversized accumulated buffer 504, this approach can adjust the edge distance 502 and bring the viewer and current playing position 506 closer in time to the live head position 510. In some embodiments, this approach can be implemented as a seek-based approach that seeks a subsequent keyframe within the accumulated buffer 504 and jumps the current playing position 506 to the keyframe.

In various embodiments, jumping the buffer loading position is an approach in which the buffer loading position 508 is jumped to a position 514 that is not yet included in the accumulated buffer 504 (e.g., at t=−1 second). In this example, a portion of the live video stream that is bounded by t=−4 seconds and t=−1 second is skipped but no portion of the accumulated buffer 504 between t=−10 second and t=−4 second is discarded. As no portion of the accumulated buffer 504 is discarded, this approach can be desirable for a viewer with a slow (or unreliable) network connection. Under this approach, a viewer may experience a discontinuity after all of the accumulated buffer 504 has been presented (e.g., at t=−4 seconds). In some embodiments, the buffer loading position 508 can be jumped based on detection of a manifest discontinuity. A manifest discontinuity can indicate a discontinuity in live video stream segments. When the latency manager module 212 of FIG. 2 detects a manifest discontinuity, the latency manager module 212 can determine the best position in the live video stream to jump the buffer loading position (e.g., t=−1 second). In some embodiments, the buffer loading position 508 can be jumped based on pause loading. When the latency manager module 212 of FIG. 2 detects that the accumulated buffer 504 has accumulated more than a threshold amount of the live video stream, the latency manager 212 can provide a pause loading command with a desired pause duration to the playback control module 220 of FIG. 2. Upon receiving the pause loading command, the playback control module 220 can pause the loading of the live video stream until the pause duration elapses. After the pause duration, the playback control module 220 can start loading the live video stream from the live head position 510. Many variations are possible.

Figure 6:
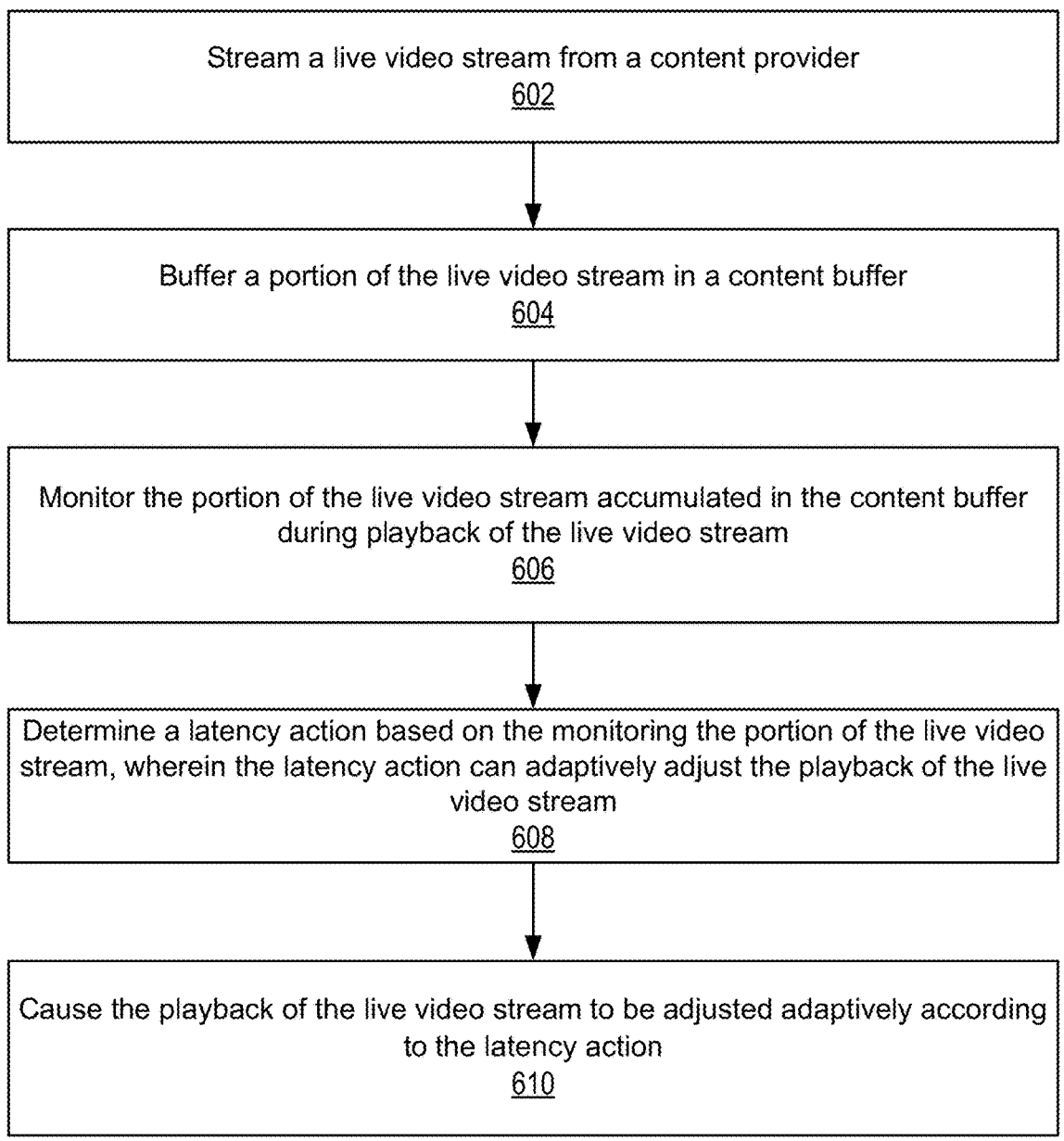
FIG. 6 illustrates an example method associated with performing a latency action, according to an embodiment of the present technology.

FIG. 6 illustrates an example method 600 associated with performing a latency action, according to an embodiment of the present technology. It should be appreciated that there can be additional, fewer, or alternative steps performed in similar or alternative orders, or in parallel, based on the various features and embodiments discussed herein unless otherwise stated.

At block 602, the example method 600 can stream a live video stream from a content provider.

At block 604, the example method 600 can buffer a portion of the live video stream in a content buffer.

At block 606, the example method 600 can monitor the portion of the live video stream accumulated in the content buffer during playback of the live stream.

At block 608, the example method 600 can determine a latency action based on the monitoring the portion, wherein the latency action can adaptively adjust the playback of the live video stream.

At block 610, the example method 600 can cause the playback of the live video stream to be adjusted adaptively according to the latency action.

Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 7:
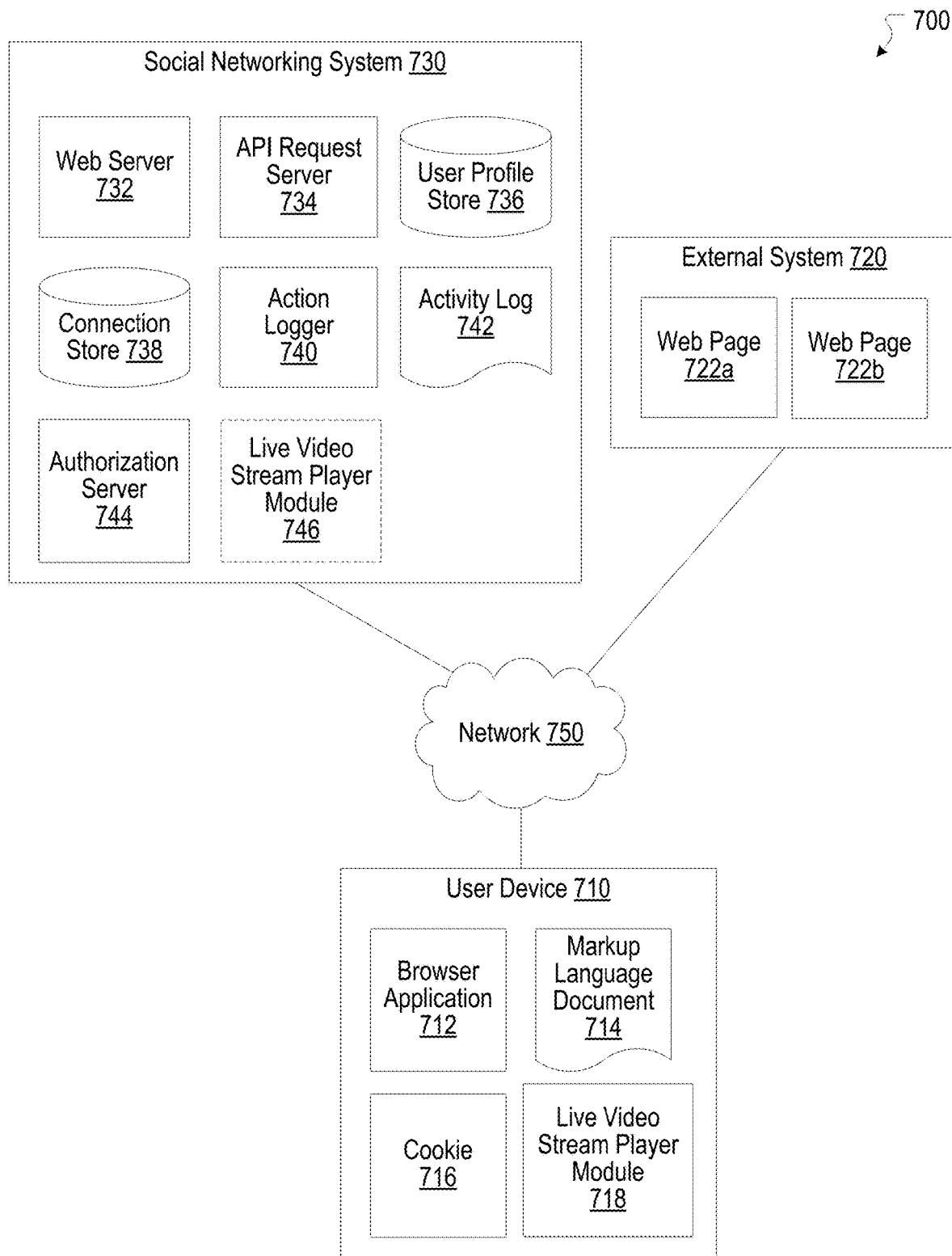
FIG. 7 illustrates a network diagram of an example system including an example social networking system that can be utilized in various scenarios, according to an embodiment of the present technology.

FIG. 7 illustrates a network diagram of an example system 700 including an example social networking system that can be utilized in various scenarios, according to an embodiment of the present technology. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

In some embodiments, the user device 710 can include a live video stream player module 718. The live video stream player module 718 can be implemented with, for example, the live video stream player module 102 of FIG. 1, as discussed in more detail herein.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a live video stream player module 746. The live video stream player module 746 can, for example, be implemented with or support one or more functionalities of the live video stream player module 102, as discussed in more detail herein. It should be appreciated that there can be many variations or other possibilities.

Hardware Implementation

Figure 8:
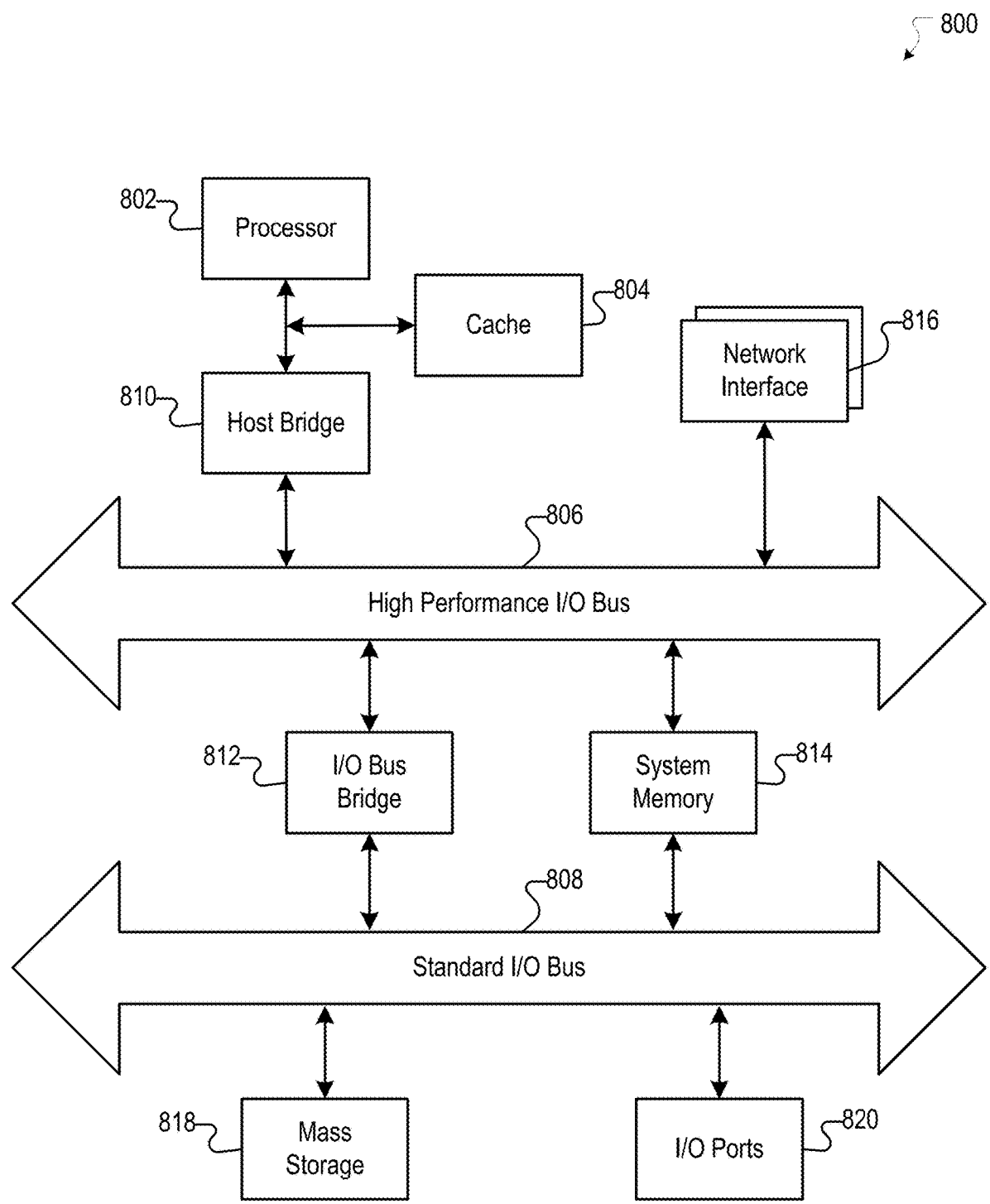
FIG. 8 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 8 illustrates an example of a computer system 800 that may be used to implement one or more of the embodiments described herein according to an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 720, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   streaming, by a computing device, a live video stream from a content provider;
   buffering, by the computing device, a portion of the live video stream in a content buffer;
   monitoring, by the computing device, the portion of the live video stream accumulated in the content buffer during playback of the live video stream;
   determining, by the computing device, a latency action based on the monitoring the portion of the live video stream, wherein the latency action can adaptively adjust the playback of the live video stream;
   causing, by the computing device, the playback of the live video stream to be adjusted adaptively according to the latency action;
   receiving, by the computing device, a signal from the content provider that indicates a stall caused by the content provider; and
   in response to the receiving the signal from the content provider, calling, by the computing device, a latency manager configured to cause the computing device to adaptively adjust the playback so that future stalls can be avoided.

2. The computer-implemented method of claim 1, further comprising:
monitoring, by the computing device, an amount of available bandwidth between the computing device and the content provider,
wherein the determining the latency action based on the monitoring the portion comprises:
adaptively adjusting, by the computing device, at least one buffer size threshold based on the amount of available bandwidth or an occurrence of a stall; and
determining, by the computing device, when to perform the latency action based on the portion of the live video stream accumulated in the content buffer and the at least one buffer size threshold.

3. The computer-implemented method of claim 1, further comprising:
monitoring, by the computing device, an amount of available bandwidth between the computing device and the content provider,
wherein the determining the latency action based on the monitoring the portion comprises:
adaptively adjusting, by the computing device, a trim amount based on the amount of available bandwidth or an occurrence of a stall; and
determining, by the computing device, an amount of the portion of the live video stream accumulated in the content buffer to jump a currently playing position or a buffer loading position based at least in part on the trim amount.

4. The computer-implemented method of claim 1, wherein the causing the playback of the live video stream to be adjusted adaptively comprises:
jumping, by the computing device, a currently playing position associated with the playback from a first position associated with a first time to a second position associated with a second time, and wherein, based on the jumping, the playback excludes the live video stream accumulated in the content buffer between the first position and the second position.

5. The computer-implemented method of claim 1, wherein the causing the playback of the live video stream to be adjusted adaptively comprises:
jumping, by the computing device, a buffer loading position associated with the playback from a first position associated with a first time to a second position associated with a second time, and wherein, based on the jumping, a portion of the live video stream between the first position and the second position is not accumulated in the content buffer.

6. The computer-implemented method of claim 5, wherein the jumping the buffer loading position associated with the playback comprises:
determining, by the computing device, that a manifest discontinuity is detected during receipt of the live video stream.

7. The computer-implemented method of claim 5, wherein the jumping the buffer loading position associated with the playback comprises:
determining, by the computing device, that a threshold amount of the live video stream is accumulated in the content buffer; and
pausing, by the computing device, receipt of the live video stream for a pause duration period.

8. The computer-implemented method of claim 1, wherein the monitoring the portion of the live video stream accumulated in the content buffer during the playback of the live video stream comprises: calculating, by the computing device, a standard deviation for fluctuations of the portion of the live video stream accumulated in the content buffer within a defined time window.

9. The computer-implemented method of claim 1, further comprising:
determining, by the computing device, a rate associated with the latency action; and
limiting, by the computing device, the latency action from performance so that the rate does not exceed a specified rate of latency actions.

10. The computer-implemented method of claim 1, wherein the latency manager is woken from a sleep state in response to the signal.

11. A computing device comprising:
at least one processor; and
a memory storing instructions that, when executed by the at least one processor, cause the computing device to perform a method comprising:
streaming a live video stream from a content provider;
buffering a portion of the live video stream in a content buffer;
monitoring the portion of the live video stream accumulated in the content buffer during playback of the live video stream;
determining a latency action based on the monitoring the portion of the live video stream, wherein the latency action can adaptively adjust the playback of the live video stream;
causing the playback of the live video stream to be adjusted adaptively according to the latency action;
receiving a signal from the content provider that indicates a stall caused by the content provider; and
in response to the receiving the signal from the content provider, calling a latency manager configured to cause the computing device to adaptively adjust the playback so that future stalls can be avoided.

12. The computing device of claim 11, wherein the instructions cause the computing device to further perform:
monitoring an amount of available bandwidth between the computing device and the content provider,
wherein the determining the latency action based on the monitoring the portion comprises:
adaptively adjusting at least one buffer size threshold based on the amount of available bandwidth or an occurrence of a stall; and
determining when to perform the latency action based on the portion of the live video stream accumulated in the content buffer and the at least one buffer size threshold.

13. The computing device of claim 11, wherein the instructions cause the computing device to further perform:
monitoring an amount of available bandwidth between the computing device and the content provider,
wherein the determining the latency action based on the monitoring the portion comprises:
adaptively adjusting a trim amount based on the amount of available bandwidth or an occurrence of a stall; and
determining an amount of the portion of the live video stream accumulated in the content buffer to jump a currently playing position or a buffer loading position in the latency action based at least in part on the trim amount.

14. The computing device of claim 11, wherein the causing the playback of the live video stream to be adjusted adaptively comprises:
  jumping a currently playing position associated with the playback from a first position associated with a first time to a second position associated with a second time, and wherein, based on the jumping, the playback excludes the live video stream accumulated in the content buffer between the first position and the second position.

15. The computing device of claim 11, wherein the causing the playback of the live video stream to be adjusted adaptively comprises:
  jumping a buffer loading position associated with the playback from a first position associated with a first time to a second position associated with a second time, and wherein, based on the jumping, a portion of the live video stream between the first position and the second position is not accumulated in the content buffer.

16. A non-transitory computer-readable storage medium including instructions that, when executed by at least one processor of a computing device, cause the computing device to perform a method comprising:
  streaming a live video stream from a content provider;
  buffering a portion of the live video stream in a content buffer;
  monitoring the portion of the live video stream accumulated in the content buffer during playback of the live video stream;
  determining a latency action based on the monitoring the portion, wherein the latency action can adaptively adjust the playback of the live video stream;
  causing the playback of the live video stream to be adjusted adaptively according to the latency action
  receiving a signal from the content provider that indicates a stall caused by the content provider; and
  in response to the receiving the signal from the content provider, calling a latency manager configured to cause the computing device to adaptively adjust the playback so that future stalls can be avoided.

17. The non-transitory computer-readable storage medium of claim 16, wherein the instructions further cause the computing device to perform:
  monitoring an amount of available bandwidth between the computing device and the content provider,
  wherein the determining the latency action based on the monitoring the portion comprises:
    adaptively adjusting at least one buffer size threshold based on the amount of available bandwidth or an occurrence of a stall; and
    determining when to perform the latency action based on the portion of the live video stream accumulated in the content buffer and the at least one buffer size threshold.

18. The non-transitory computer-readable storage medium of claim 16, wherein the instructions cause the computing device to further perform:
  monitoring an amount of available bandwidth between the computing device and the content provider,
  wherein the determining the latency action based on the portion comprises:
    adaptively adjusting a trim amount based on the available bandwidth or an occurrence of a stall; and
    determining an amount of the portion of the live video stream accumulated in the content buffer to jump a currently playing position or a buffer loading position based at least in part on the trim amount.

19. The non-transitory computer-readable storage medium of claim 16, wherein the causing the playback of the live video stream to be adjusted adaptively comprises:
  jumping a currently playing position associated with the playback from a first position associated with a first time to a second position associated with a second time, and wherein, based on the jumping, the playback excludes the live video stream accumulated in the content buffer between the first position and the second position.

20. The non-transitory computer-readable storage medium of claim 16, wherein the causing the playback of the live video stream to be adjusted adaptively comprises:
  jumping a buffer loading position associated with the playback from a first position associated with a first time to a second position associated with a second time, and wherein, based on the jumping, the live video stream between the first position and the second position is not accumulated in the content buffer.

* * * * *